United States Patent Office 2,998,434
Patented Aug. 29, 1961

2,998,434
CYCLOPENTANOPHENANTHRENE COMPOUNDS
Howard J. Ringold and George Rosenkranz, Mexico City, Mexico, assignors to Syntex S. A., Mexico City, Mexico, a corporation of Mexico
No Drawing. Filed May 19, 1960, Ser. No. 30,081
Claims priority, application Mexico June 24, 1959
29 Claims. (Cl. 260—397.4)

The present invention relates to novel cyclopentanophenanthrene compounds.

More particularly the invention relates to 6-halo-(bromo, fluoro or chloro)-16(α or β)-17α-diacyloxy-Δ$^{4,6}$-pregnadiene-3,20-diones, which may also contain an additional double bond between C-1 and C-2.

The novel compounds of the present invention which are potent progestational agents are illustrated by the following formulas:

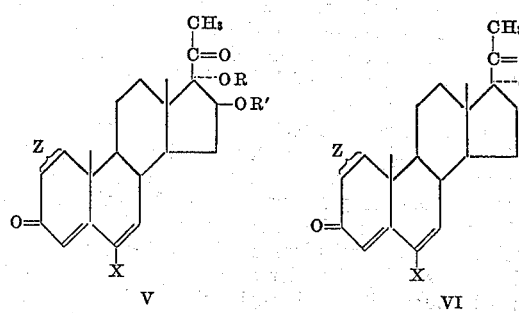

In the above formulas, Z indicates a double bond between C-1 and C-2 or a saturated linkage between C-1 and C-2; X represents bromine, fluorine or chlorine and R and R' represent an acyl group of a hydrocarbon carboxylic acid containing less than 12 carbon atoms, saturated or unsaturated, of straight chain or branched chain aliphatic, cyclic, cyclic-aliphatic, aromatic and which may be substituted by functional groups such as hydroxyl, acyloxy of up to 12 carbon atoms, alkoxy of up to 8 carbon atoms, amino or halogen. Typical of such ester groups are the acetate, propionate, butyrate, hemisuccinate, enanthate, benzoate, trimethylacetate, phenoxyacetate, aminoacetate, cyclopentylpropionate and β-chloropropionate. Water soluble derivatives of the novel compounds such as the alkali metal salts of the hemisuccinates or the hydrohalides of esters formed with an amino acid are also included within the present invention. The acyl groups at C-16 and C-17 may be the same or different from each other.

The novel 6-halo-16β,17α-diacyloxy-Δ$^{4,6}$-pregnadiene-3,20-diones and the 1-dehydro derivatives thereof (V), are prepared by a process illustrated by the following equation:

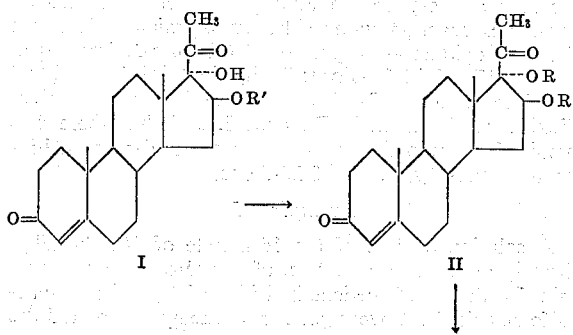

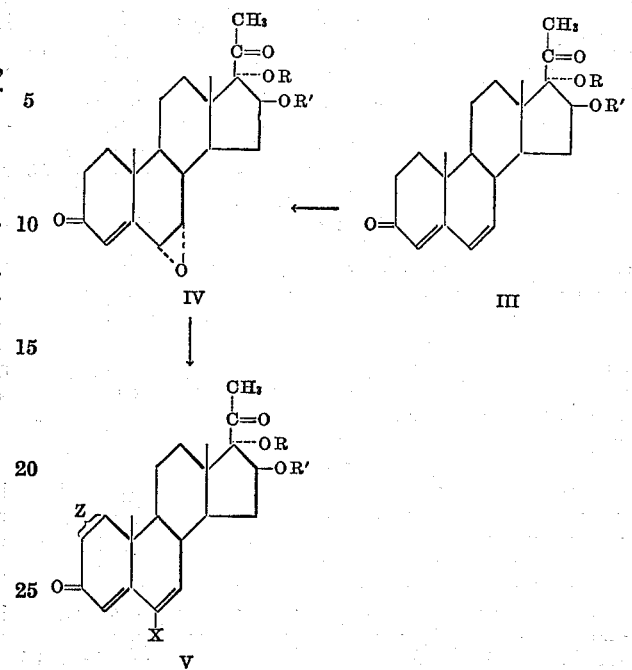

In practicing the process above outlined, a 16β-ester, preferably the 16β-acetate, of 16β,17α-dihydroxy-progesterone (I) is esterified at C-17α by treatment with a carboxylic acid anhydride in the presence of an acid catalyst such as p-toluenesulfonic acid and in the presence or absence of a solvent inert to the reaction such as acetic acid or benzene. The resulting 16β,17α-diacyloxy-progesterone (II) is then dehydrogenated at C-6,7 by reaction with a quinone having an oxidation-reduction potential of less than —0.5, and preferably those having potentials of —0.65 or less, such as tetrachloro-p-benzoquinone(chloranil), 1,2- or 1,4-naphthoquinone, in an inert solvent such as tertiary butanol, xylene or a mixture of ethyl acetate and acetic acid or tertiary amyl acetate and acetic acid under reflux conditions. The thus formed 16β,17α-diacyloxy-Δ$^{4,6}$-pregnadiene-3,20-dione (III) which per se are potent progestational agents, was dissolved in methylene chloride and selectively oxidized with a peracid such as monoperphthalic acid in ether solution to form the 6α,7α-oxido - 16β,17α - diacyloxy - Δ$^4$ - pregnene - 3,20 - dione (IV). The latter compound is then treated with hydrogen chloride or hydrogen bromide in an inert solvent such as acetic acid at a temperature of about 15° C. for a period of time from 3 to 12 hours to produce the corresponding 6-halo(chloro or bromo)-16β,17α-diacyloxy-Δ$^{4,6}$-pregnadiene-3,20-dione.

Upon treatment of the 6α,7α-oxido-16β,17α-diacyloxy-Δ$^4$-pregnene-3,20-dione (IV) with anhydrous hydrogen fluoride at low temperature in a solvent such as tetrahydrofuran or chloroform or upon treatment with boron trifluoride in a solution of benzene and ether at room temperature for 3 hours as described by Ringold, Bowers, Mancera and Rosenkranz in copending application Serial No. 753,629 filed August 7, 1958, there is formed 6β-fluoro - 16β,17α - diacyloxy - Δ$^4$ - pregnen - 7α - ol - 3,20-dione. Treatment of the latter compound with an acid, preferably a slow stream of dry hydrogen chloride is introduced into a solution of the 6β-fluoro-16β,17α-diacyloxy-Δ$^4$-pregnen-7α-ol-3,20-dione in glacial acetic acid at about 25° C. for 1 day, results in the formation of 6 - fluoro - 16β,17α - diacyloxy - Δ$^{4,6}$ - pregnadiene-3,20-dione (V).

For introduction of an additional double bond between C–1 and C–2, the compounds are treated by known methods, such as by microbiological methods as, for example, incubation with Corynebacterium simplex ATCC 6946, or by refluxing the compound with selenium dioxide, preferably in mixture with tertiary butanol and in the presence of catalytic amounts of pyridine under an atmosphere of nitrogen for 1 to 3 days.

The novel 6-halo(chloro or fluoro)-16α,17α-diacyloxy-Δ$^{4,6}$-pregnadiene-3,20-diones or the 1-dehydro derivatives thereof as represented by Formula VI, are prepared by refluxing at 6(α or β)-halo(chloro or fluoro)-16α,17α-diacyloxy-Δ$^4$-pregnene-3,20-dione, with or without an additional double bond at C–1,2, disclosed in our copending application Serial No. 56, filed on January 4, 1960, which is a continuation-in-part of our copending application Serial No. 807,774 filed on April 21, 1959, with chloranil in an inert solvent such as tertiary butanol, tertiary amyl alcohol, xylene or a mixture of amyl acetate or ethyl acetate and acetic acid to thus form the corresponding 6-halo(chloro or fluoro)-16α,17α-diacyloxy-Δ$^{4,6}$-pregnadiene-3,20-dione or 6-halo(chloro or fluoro)-16α,17α-diacyloxy-Δ$^{1,4,6}$-pregnatriene-3,20-dione.

Alternatively, the novel 6-halo(chloro, fluoro or bromo)-16α,17α-diacyloxy-Δ$^{4,6}$-pregnadiene-3,20-diones and the 1-dehydro derivatives thereof are prepared from the 16α,17α-diacyloxy-Δ$^4$-pregnene-3,20-diones, disclosed in our copending applications Serial No. 807,774, now abandoned, filed on April 21, 1959, and Serial No. 56 filed on January 4, 1960, by treatment with chloranil for the dehydrogenation at C–6,7 followed by peracid oxidation to form the 6α,7α-epoxide and then treatment with either hydrogen chloride, hydrogen bromide, hydrogen fluoride or boron trifluoride in the same manner as previously set forth to form the desired 6-halo(chloro, bromo or fluoro)-16α,17α-diacyloxy-Δ$^{4,6}$-pregnadiene-3,20-dione) and (by further treatment with selenium dioxide) 6-halo(chloro, bromo or fluoro)-Δ$^{1,4,6}$-pregnatriene-3,20-dione.

The following examples serve to illustrate but are not intended to limit the scope of the present invention:

PREPARATION

For preparing the 16-esters of 16β,17α-dihydroxy-progesterone, the method described by Heusler and Wettstein (Chem. Ber., 67, 1301 (1954)) for the preparation of the 16-acetate of 16β,17α-dihydroxy-progesterone was followed, which method is hereinafter set forth.

A solution of 3 g. of 16α,17α-oxido-Δ$^4$-pregnene-3,20-dione in 60 cc. of glacial acetic acid was treated with a mixture of 1.25 cc. of concentrated sulfuric acid and 5 g. of acetic acid. Optionally another lower aliphatic acid, such as propionic, butyric or cyclohexanecarboxylic acid may be utilized. The mixture was then kept at room temperature for a period of time between 8 and 24 hours, generally increasing the reaction time when the reaction was effected with a polycarboxylic acid. After pouring into 350 cc. of water, the product was extracted with benzene, the extract was washed with 5% aqueous sodium bicarbonate solution and then with water to neutral, dried over anhydrous sodium sulfate and the benzene was evaporated under reduced pressure. Recrystallization of the residue from benzene-hexane afforded the desired 16-ester of 16β,17α-dihydroxy-progesterone.

*Example I*

A mixture of 5g. of the 16-acetate of 16β,17α-dihydroxy-progesterone, 25 cc. of acetic anhydride, 150 cc. of acetic acid and 5 g. of p-toluenesulfonic acid was kept at room temperature for 4 hours, poured into ice water, heated for half an hour on the steam bath, cooled and the precipitate was collected, washed with water, dried and recrystallized from acetone-hexane, thus yielding the diacetate of 16β,17α-dihydroxy-progesterone.

A mixture of 5 g. of the above compound, 100 cc. of t-butanol, and 2 g. of chloranil was refluxed under an atmosphere of nitrogen for 8 hours; the solvent was evaporated under reduced pressure, the residue was extracted with ethyl acetate and the extract was washed with 5% cold aqueous sodium hydroxide solution until the washings were colorless, then with water to neutral, dried over anhydrous sodium sulfate and the ethyl acetate was evaporated. Recrystallization of the residue from acetone-hexane furnished the diacetate of 16β,17α-dihydroxy-Δ$^{4,6}$-pregnadiene-3,20-dione.

To a solution of 3.25 g. of the above compound in 250 cc. of methylene chloride was added 350 cc. of a 5.5% solution of monoperphthalic acid in ether and the mixture was kept at room temperature for 24 hours. It was then washed with 5% aqueous sodium carbonate solution, then with water to neutral, dried over anhydrous sodium sulfate and concentrated until crystallization started. After cooling the precipitate was collected by filtration, air dried and recrystallized from acetone-hexane, thus giving the diacetate of 6α,7α-oxido-Δ$^4$-pregnene-16β,17α-diol-3,20-dione.

A slow stream of dry hydrogen chloride was introduced for 8 hours into a mixture of 3 g. of the above oxido-compound and 150 cc. of glacial acetic acid, maintaining the temperature around 15° C. The mixture was concentrated to one third of its original volume, under reduced pressure and at temperatures around room temperature, then poured into ice water and the precipitate was collected, washed with water, dried and recrystallized from acetone-ether. There was thus obtained 6-chloro-16β,17α-diacetoxy-Δ$^{4,6}$-pregnadiene-3,20-dione.

A mixture of 1 g. of the above compound, 50 cc. of t-butanol, 300 mg. of selenium dioxide and a few drops of pyridine was refluxed under an atmosphere of nitrogen for 48 hours, filtered through celite while hot and the filtrate was poured into ice water. The precipitate was collected, washed with water, dried and purified by chromatography on neutral alumina, thus giving the diacetate of 6-chloro-16β,17α-diacetoxy-Δ$^{1,4,6}$-pregnatriene-3,20-dione.

*Example II*

A mixture of 5 g. of the 16-propionate of 16β,17α-dihydroxy-progesterone, 5 g. of caproic anhydride, 200 cc. of anhydrous benzene and 1 g. of p-toluenesulfonic acid was kept at room temperature for 48 hours. The solution was then washed with 5% aqueous sodium carbonate solution and water to neutral, dried over anhydrous sodium sulfate and the solvent was evaporated. By chromatography of the residue on neutral alumina there was obtained the 16-propionate-17-caproate of 16β,17α-dihydroxy-progesterone. There was then followed the procedure described in Example I and thus was obtained by the reaction with chloranil the 16-propionate-17-caproate of Δ$^{4,6}$-pregnadiene-16β,17α-diol-3,20-dione, and then by epoxidation of the latter the 16-propionate-17-caproate of 6α,7α-oxido-Δ$^4$-pregnene-16β,17α-diol-3,20-dione.

In the following step, namely the opening of the epoxide ring, instead of the hydrogen chloride employed in the reaction described in Example I, there was used an analogous reaction with hydrogen bromide to produce the 16-propionate-17-caproate of 6-bromo-Δ$^{4,6}$-pregnadiene-16β,17α-diol-3,20-dione; finally the third double bond was introduced at C–1,2 by the reaction with selenium dioxide, as described in Example I, and thus there was obtained the 16-propionate-17-caproate of 6-bromo-Δ$^{1,4,6}$-pregnatriene-16β,17α-diol-3,20-dione.

*Example III*

A solution of 1 g. of the 16-acetate of 16β,17α-dihydroxy-progesterone in 150 cc. of anhydrous benzene was mixed with 3 g. of acetic anhydride and 1 g. of p-toluenesulfonic acid, kept overnight at room temperature and the product was then isolated as described in the preceding example for the reaction of the 16-propionate of 16β,17α-dihydroxy-progesterone with caproic anhydride. There was thus obtained the diacetate of 16β,17α-dihydroxy-progesterone, identical with the intermediate prepared in accordance with Example I.

In accordance with the method of Example I, there was then obtained, through the 6-dehydro compound, the diacetate of 6α,7α-oxido-Δ⁴-pregnene-16β,17α-diol-3,20-dione.

3 g. of the above compound was treated with 3 cc. of boron trifluoride etherate in mixture with 100 cc. of ether and 100 cc. of benzene and kept for 3 hours at room temperature; the solution was then washed with water, dried over anhydrous sodium sulfate and the solvent was evaporated. Chromatography of the residue on neutral alumina yielded the 16,17-diacetate of 6β-fluoro-Δ⁴-pregnene-7α,16β,17α-triol-3,20-dione.

2 g. of the above fluorohydrin was dissolved in 100 cc. of glacial acetic acid and a slow stream of dry hydrogen chloride was introduced into the solution for 24 hours at 25° C. After pouring into water the product was extracted with ethyl acetate, successively washed with 5% aqueous sodium carbonate solution and water, dried over anhydrous sodium sulfate and the ethyl acetate was evaporated. Recrystallization of the residue from acetone-hexane furnished the diacetate of 6-fluoro-Δ⁴,⁶-pregnadiene-16β,17α-diol-3,20-dione.

Upon subsequent dehydrogenation with selenium dioxide (cf. Example I) there was produced the diacetate of 6-fluoro-Δ¹,⁴,⁶-pregnatriene-16β,17α-diol-3,20-dione.

*Example IV*

By substituting the 16-butyrate of 16β,17α-dihydroxy-progesterone in the method described in Example III, there was obtained the 16-butyrate-17-acetate of 6-fluoro-Δ⁴,⁶-pregnadiene-16β,17α-diol-3,20-dione and of 6-fluoro-Δ¹,⁴,⁶-pregnatriene-16β,17α-diol-3,20-dione.

*Example V*

By treating the 16,17-diacetate of 6α,7α-oxido-Δ⁴-pregnene-16β,17α-diol-3,20-dione obtained as in Example I with anhydrous hydrogen bromide in acetic acid for 8 hours and then dehydrogenating with selenium dioxide, there was obtained respectively 6-bromo-16β,17α-diacetoxy-Δ⁴,⁶-pregnadiene-3,20-dione and 6-bromo-16β,17α-diacetoxy-Δ¹,⁴,⁶-pregnatriene-3,20-dione.

*Example VI*

A mixture of 5 g. of the diacetate of 6α-chloro-Δ⁴-pregnene-16α,17α-diol-3,20-dione, disclosed in our aforementioned copending application Serial No. 807,774, 10 g. of chloranil and 100 cc. of tertiary butanol was refluxed under an atmosphere of nitrogen for 3 hours. The mixture was evaporated to dryness and the residue was extracted with 100 cc. of methylene chloride; the extract was washed with cold 5% sodium hydroxide solution until the washings were colorless, then with water to neutral, dried over anhydrous sodium sulfate and the solvent was evaporated. The residue consisted of the diacetate of 6-chloro-Δ⁴,⁶-pregnadiene-16α,17α-diol-3,20-dione, which was recrystallized from acetone-hexane.

A mixture of 2.0 g. of the above compound, 100 cc. of tertiary butanol, 500 mg. of selenium dioxide and a few drops of pyridine was refluxed for 18 hours under an atmosphere of nitrogen. It was filtered while hot through celite, the filtrate was evaporated to dryness under reduced pressure; the residue was decolorized by refluxing with 100 cc. of acetone and 3 g. of decolorizing charcoal and the crude product was further purified by chromatography on neutral alumina. There was thus obtained the diacetate of 6-chloro-Δ¹,⁴,⁶-pregnatriene-16α,17α-diol-3,20-dione.

*Example VII*

In the method of Example VI, the diacetate of 6α-chloro-Δ⁴-pregnene-16α,17α-diol-3,20-dione was substituted by its 6β-isomer to produce the diacetate of 6-chloro-Δ⁴,⁶-pregnadiene-16α,17α-diol-3,20-dione and the corresponding 1-dehydro derivative thereof, identical with the compounds obtained in such example.

*Example VIII*

A mixture of 5 g. of the diacetate of 6α-chloro-Δ¹,⁴-pregnadiene-16α,17α-diol-3,20-dione, 10 g. of chloranil, 100 cc. of n-amyl acetate and 10 cc. of glacial acetic acid was refluxed for 16 hours. It was then washed with 5% aqueous sodium hydroxide solution until the washings were colorless, then with water to neutral, dried over anhydrous sodium sulfate and the solvent was evaporated under reduced pressure. The residue was purified by crystallization from acetone-hexane thus furnishing the diacetate of 6-chloro-Δ¹,⁴,⁶-pregnatriene-16α,17α-diol-3,20-dione, identical with the compound described in the preceding example.

*Example IX*

By following the method described in Example VI but employing the diacetate of 6α-fluoro-Δ⁴-pregnene-16α,17α-diol-3,20-dione instead of the corresponding 6α-chloro compound, there was obtained, in the reaction with chloranil, the diacetate of 6-fluoro-Δ⁴,⁶-pregnadiene-16α,17α-diol-3,20-dione and by subsequent treatment with selenium dioxide, there was obtained the diacetate of 6-fluoro-Δ¹,⁴,⁶-pregnatriene-16α,17α-diol-3,20-dione.

*Example X*

In the method of the preceding example, the diacetate of 6β-fluoro-Δ⁴-pregnene-16α,17α-diol-3,20-dione was employed instead of the 6α-fluoro compound to produce the same compounds as formed in such example.

*Example XI*

In accordance with the method of dehydrogenation with chloranil in t-butanol described in Example I, 5 g. of the diacetate of 16α,17α-dihydroxy-progesterone was converted into the diacetate of 16α,17α-dihydroxy-Δ⁴,⁶-pregnadiene-3,20-dione.

A solution of 4.0 g. of the above compound in 200 cc. of methylene chloride was treated with 130 cc. of a 5% ether solution of monoperphthalic acid and the mixture was kept at room temperature for 24 hours; it was then washed with 5% aqueous sodium carbonate solution and then with water, dried over anhydrous sodium sulfate and concentrated until crystallization started. After cooling, the precipitate was collected by filtration, washed with water and air dried. By subsequent chromatography on neutral alumina, there was obtained the diacetate of 6α,7α-oxido-Δ⁴-pregnene-16α,17α-diol-3,20-dione.

A slow stream of hydrogen bromide was introduced for 1 hour into a solution of 2 g. of the above compound in 100 cc. of glacial acetic acid, maintaining the temperature at 15° C. After pouring into ice water, the precipitate was collected, washed with water, dried under vacuum and purified by chromatography on neutral alumina, thus giving the diacetate of 6-bromo-Δ⁴,⁶-pregnadiene-16α,17α-diol-3,20-dione.

By subsequent reflux of 1 g. of the above compound with selenium dioxide, following for this reaction and for the isolation of the product the procedure described in Example I, there was obtained the diacetate of 6-bromo-Δ¹,⁴,⁶-pregnatriene-16α,17α-diol-3,20-dione.

*Example XII*

By employing the 16-propionate-17-cyclopentylpropionate of 6(α or β)-fluoro-Δ⁴-pregnene-16α,17α-diol-3,20-dione or of 6(α or β)-chloro-Δ⁴-pregnene-16α,17α-diol-3,20-dione (disclosed in our copending application Serial No. 807,774) as the starting materials and by the methods described in Example VI, there was obtained the 16-propionate-17-cyclopentylpropionate of 6-fluoro-Δ⁴,⁶-pregnadiene-16α,17α-diol-3,20-dione, the 16-propionate-17- cyclopentylpropionate of 6-chloro-Δ⁴,⁶-pregnadiene-16α,17α-diol-3,20-dione and the corresponding 1-dehydro derivatives.

*Example XIII*

When in the method described in Example XI the diacetate of 16α,17α-dihydroxy-progesterone was substituted by the dipropionate or dicaproate, described in our copending application Serial No. 807,774, there was obtained the corresponding diesters of 6-bromo-Δ⁴,⁶-pregnadiene-16α,17α-diol-3,20-dione and of 6-bromo-Δ¹,⁴,⁶-pregnatriene-16α,17α-diol-3,20-dione.

*Example XIV*

The methods described in Examples I, II and III were applied to other esters such as the 16-cyclohexanecarboxylate-17-acetate of 16β,17α-dihydroxy-progesterone, the 16-butyrate-17-propionate of 16β,17α-dihydroxy-progesterone and the 16-enanthate-17-acetate of 16β,17α-dihydroxy-progesterone and there were formed the corresponding 6-chloro, 6-fluoro and 6-bromo-6-dehydro and 1,6-bisdehydro derivatives.

*Example XV*

The method described in Example VI was applied to other esters such as the 16-butyrate-17-acetate of 6α-fluoro-16α,17α-dihydroxy-progesterone and to the 16-enanthate-17-propionate of 6α-chloro-16α,17α-dihydroxy-progesterone to obtain the corresponding 6-dehydro and 1,6-bisdehydro derivatives thereof.

We claim:

1. A compound of the following formula:

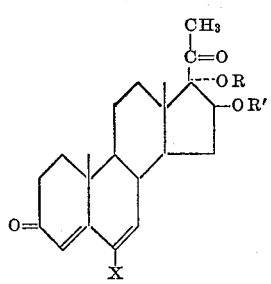

wherein R and R' each represent a hydrocarbon carboxylic acyl group of less than 12 carbon atoms and X is selected from the group consisting of fluorine, chlorine and bromine.

2. 6 - chloro - 16β,17α - diacetoxy - Δ⁴,⁶ - pregnadiene-3,20-dione.

3. The 16-propionate-17-caproate of 6-bromo-Δ⁴,⁶-pregnadiene-16β,17α-diol-3,20-dione.

4. 6 - fluoro - 16β,17α - diacetoxy - Δ⁴,⁶ - pregnadiene-3,20-dione.

5. 6 - bromo - 16β,17α - diacetoxy - Δ⁴,⁶ - pregnadiene-3,20-dione.

6. The 16-butyrate-17-acetate of 6-fluoro-Δ⁴,⁶-pregnadiene-16β,17α-diol-3,20-dione.

7. A compound of the following formula:

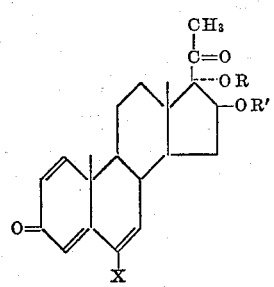

wherein R and R' each represent a hydrocarbon carboxylic acyl group of less than 12 carbon atoms and X is selected from the group consisting of fluorine, chlorine and bromine.

8. 6 - chloro - 16β,17α - diacetoxy - Δ¹,⁴,⁶ - pregnatriene-3,20-dione.

9. The 16-propionate-17-caproate of 6-bromo-Δ¹,⁴,⁶-pregnatriene-16β,17α-diol-3,20-dione.

10. 6 - fluoro- 16β,17α - diacetoxy - Δ¹,⁴,⁶ - pregnatriene-3,20-dione.

11. 6 - bromo - 16β,17α - diacetoxy - Δ¹,⁴,⁶ - pregnatriene-3,20-dione.

12. The 16-butyrate-17-propionate of 6-fluoro-Δ¹,⁴,⁶-pregnatriene-3,20-dione.

13. A compound of the following formula:

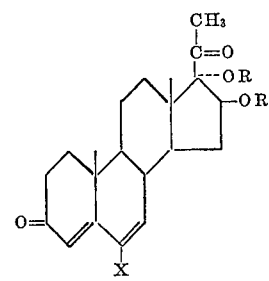

wherein R and R' each represent a hydrocarbon carboxylic acyl group of less than 12 carbon atoms and X is selected from the group consisting of fluorine, chlorine and bromine.

14. 6 - chloro - 16α,17α - diacetoxy - Δ⁴,⁶ - pregnadiene-3,20-dione.

15. 6 - fluoro - 16α,17α - diacetoxy - Δ⁴,⁶ - pregnadiene-3,20-dione.

16. 6 - bromo - 16α,17α - diacetoxy - Δ⁴,⁶ - pregnadiene-3,20-dione.

17. The 16-propionate-17-cyclopentylpropionate of 6-chloro-Δ⁴,⁶-pregnadiene-16α,17α-diol-3,20-dione.

18. The dicaproate of 6-bromo-Δ⁴,⁶-pregnadiene-16α,17α-diol-3,20-dione.

19. The 16-enanthate-17-propionate of 6-chloro-Δ⁴,⁶-pregnadiene-16α,17α-diol-3,20-dione.

20. The 16-butyrate-17-acetate of 6-fluoro-Δ⁴,⁶-pregnadiene-16α,17α-diol-3,20-dione.

21. A compound of the following formula:

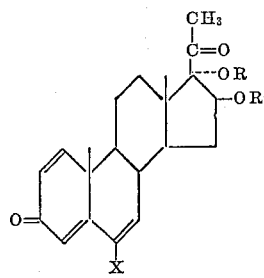

wherein R and R' each represent a hydrocarbon carboxylic acyl group of less than 12 carbon atoms and X is selected from the group consisting of fluorine, chlorine and bromine.

22. 6 - chloro - 16α,17α - diacetoxy - Δ¹,⁴,⁶ - pregnatriene-3,20-dione.

23. 6 - fluoro - 16α,17α - diacetoxy - Δ¹,⁴,⁶ - pregnatriene-3,20-dione.

24. 6 - bromo - 16α,17α - diacetoxy - Δ¹,⁴,⁶ - pregnatriene-3,20-dione.

25. The 16-propionate-17-cyclopentylpropionate of 6-chloro-Δ¹,⁴,⁶-pregnatriene-16α,17α-diol-3,20-dione.

26. The 16-butyrate-17-acetate of 6-fluoro-Δ¹,⁴,⁶-pregnatriene-16α,17α-diol-3,20-dione.

27. A compound of the following formula:
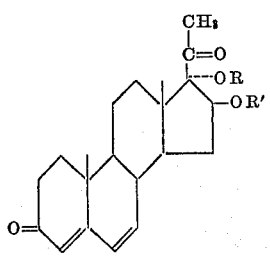
wherein R and R' each represent a hydrocarbon carboxylic acyl group of less than 12 carbon atoms.
28. The diacetate of $\Delta^{4,6}$-pregnadiene-16$\beta$,17$\alpha$-diol-3,20-dione.
29. A compound of the following formula:
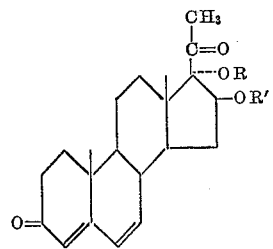
wherein R and R' each represent a hydrocarbon carboxylic acyl group of less than 12 carbon atoms.
No references cited.